No. 801,012. PATENTED OCT. 3, 1905.
E. G. HOWARD.
DISCONNECTING MECHANISM.
APPLICATION FILED FEB. 16, 1904.
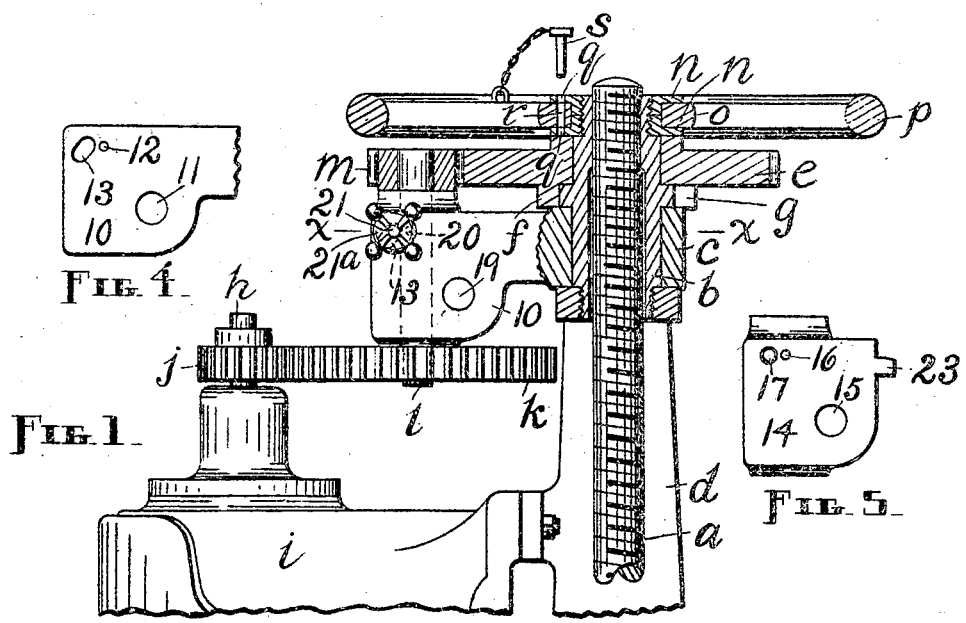
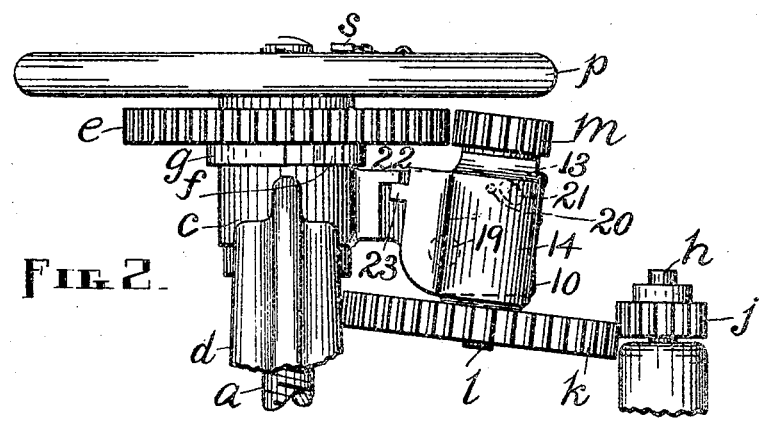
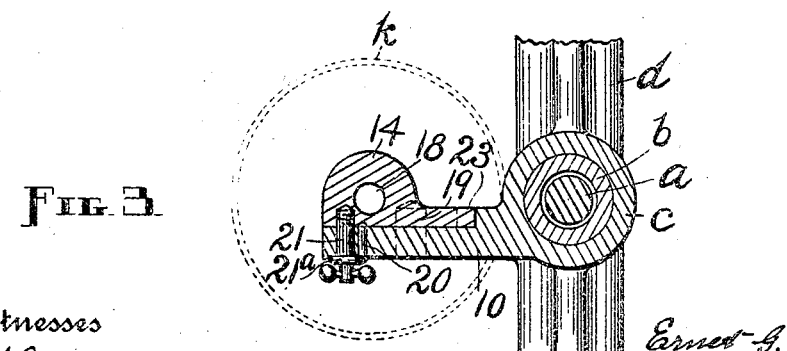
Witnesses
F. Heutter.
A. L. Stevens.
Inventor
Ernest G. Howard,
By Webster, Taft & Tilley.
Attorneys

UNITED STATES PATENT OFFICE.

ERNEST G. HOWARD, OF SPRINGFIELD, MASSACHUSETTS, ASSIGNOR TO CHAPMAN VALVE MANUFACTURING COMPANY, OF SPRINGFIELD, MASSACHUSETTS, A CORPORATION OF MASSACHUSETTS.

DISCONNECTING MECHANISM.

No. 801,012.  Specification of Letters Patent.  Patented Oct. 3, 1905.

Application filed February 16, 1904. Serial No. 193,830.

*To all whom it may concern:*

Be it known that I, ERNEST G. HOWARD, a citizen of the United States of America, residing at Springfield, in the county of Hampden and Commonwealth of Massachusetts, have invented new and useful Disconnecting Mechanism, of which the following is a specification.

My invention relates to improvements in mechanism for disconnecting the motive power from valves and the like, being particularly adapted for use with motor-driven valves; and it consists, essentially, of means introduced into the driving mechanism for permitting parts of the same to swing out of and into engagement or connection with other parts of said mechanism, as herein set forth; and the object of my invention is to provide simple and effectual means for quickly and easily disconnecting and connecting the motive power from and with the valve or other device adapted to be operated by said motive power.

This mechanism is particularly advantageous for use with large valves for controlling water, steam, &c., which are operated under ordinary circumstances by means of a motor generally attached directly to the casing or housing and with which it is customary to provide a hand-wheel to serve as a medium for manually actuating the gate or plug when for any reason the motor is out of service, and I show a practical and efficient embodiment of my mechanism by which I attain the above-noted object in the accompanying drawings, in which—

Figure 1 is a side view and partial section of the driving mechanism between a motor and a valve-spindle, showing my disconnecting mechanism introduced therein and in normal position; Fig. 2, an opposite side view of said mechanism, showing the position of the parts when the motor-shaft and valve-spindle are disconnected; Fig. 3, a cross-section on lines *x x*, Fig. 1; Fig. 4, a side view of the yoke-head bracket, and Fig. 5 a side view of the rocking bearing for the intermediate shaft.

Similar letters and figures refer to similar parts throughout the several views.

Although only the upper portions of the valve-spindle and that part of the casing or housing known as the "yoke" are shown in Figs. 1, 2, and 3, it will be understood that such spindle has a valve gate or plug at its lower end, while the yoke is supported on a cap, all in the usual and well-known manner.

As before intimated, my invention is applicable to numerous and various styles of valves and motors and other mechanical devices without material change.

In Fig. 1 what is known as an "outside-screw" spindle is illustrated; but the device is equally applicable to the inside-screw construction. A lost-motion device is shown in the mechanism illustrated in the drawings; but this is an unimportant feature so far as the present invention is concerned.

In general the invention may be described as a rocking bearing for an intermediate shaft suitably supported between the motor and valve-spindle with means to permit said bearing to assume different positions, whereby the driving mechanism may be readily disconnected or connected at will. The object in the present case of disconnecting the motor is to enable the valve-spindle to be independently operated by the hand-wheel.

Referring to the illustrations, it will be seen that the valve-spindle $a$ has its upper terminal in engagement with an internally-screw-threaded sleeve $b$, which is journaled in the yoke-head $c$ of the yoke $d$, suitable external flanges on said sleeve, one of which is removable, serving to retain it in position. A gear $e$ is loosely mounted on the sleeve $b$ and provided with a clutch projection $f$, and a clutch projection $g$ on said sleeve extends into the path of said projection $f$, so that after said gear has described a part of a revolution its clutch projection encounters the clutch projection $g$ and rotates the sleeve, which in turn acts on the spindle $a$ to raise or lower the same, according to the direction in which the gear is revolved. The object of mounting the gear $e$ loosely on the sleeve and providing the clutch projections is to enable the motor to gather sufficient momentum to overcome the resistance offered by the spindle and gate when at the limits of their travel.

The shaft $h$ of a motor $i$, which latter is securely attached to the yoke $d$, has a small gear or pinion $j$, fast thereon and in mesh with a gear $k$, fast to an intermediate shaft $l$, journaled in the manner presently to be described. A small gear or pinion $m$, fast on the upper end of the shaft $l$, meshes with the gear $e$.

The upper end of the sleeve $b$ is externally screw-threaded to receive the flanged nuts $n$ $n$. The hub $o$ of a hand-wheel $p$ is received into the groove formed by the flanges of the nuts $n$ and is adapted to revolve freely therein. The flange of each nut $n$ is provided with a hole $q$, and a hole $r$ is so arranged in the hub $o$ that it may be brought into juxtaposition with the holes $q$, so as to enable said hub to be locked to said nuts by means of a pin $s$, which can be introduced into said holes. This pin is shown poised ready for use in Fig. 1.

A support or bracket 10 extends toward the motor-shaft $h$ from the yoke-head $c$ and has holes 11 and 12 and an elongated opening or slot 13 extending through the same from side to side. A block which forms a bearing for the intermediate shaft $l$ and which is herein termed the "rocking" bearing 14 is provided with a flat side adapted to rub on the adjacent side of the bracket 10 and has openings or recesses 15, 16, and 17, the latter being screw-threaded. A projection or swell is formed on the side of the bearing 14 opposite the flat side thereof, through which a vertical passage 18 extends for the reception of the intermediate shaft $l$. A pivot 19, extending through the bracket-opening 11 into the bearing-opening 15, serves as the axis upon which said bearing rocks. A small pin 20, rounded at its inner end, fits loosely into the hole 12, and said rounded end is adapted to enter the shallow opening or recess 16 in the bearing 14 under certain conditions, as hereinafter explained. A screw 21, adapted to be manipulated by hand and provided with a flange 21$^a$, passes through the elongated opening or slot 13 in the bracket 10 into threaded engagement with the sides of the opening 17 in the bearing 14. The head of the pin 20 falls within the circumference of the screw-flange 21$^a$.

When the parts stand as shown in Fig. 1, the intermediate shaft $l$ is held in a vertical position, with its pinion $m$ in mesh with the spindle-gear $e$ and its gear $k$ in mesh with the motor-pinion $j$, by means of the screw 21 and the pin 20. The screw 21 is now in the upper end of the elongated opening 13 and tightened up, so as to cause the bracket 10 to be firmly embraced between the bearing 14 and the screw-flange 21$^a$. This engagement is rendered still more secure by the pin 20, which is forced by the flange 21$^a$ into the bearing 16. The parts now occupy their normal position, and power is communicated from the motor $i$ to the spindle $a$ through the medium of the pinion $j$, gear $k$, shaft $l$, pinion $m$, clutch projections $f$ and $g$, and sleeve $b$, the hand-wheel $p$ meanwhile running free and serving as a balance-wheel. In case the motor breaks down or for any reason it becomes desirable or necessary to operate the valve by hand the screw 21 is turned sufficiently to release the bearing 14 and permit the pin 20 to be forced out of engagement with said bearing as the latter rocks upon the pivot 19. When the mechanism is arranged as herein illustrated, this rocking movement is aided by gravity, owing to the position of the pivot 19 relative to the swinging or rocking parts, and in many instances gravity alone is sufficient to cause the disconnecting movement when the parts are released. The screw 21 when loosened is carried by the rocking bearing to the lower end of the slot 13, and the movement permitted said bearing is sufficient to entirely disengage the pinion $m$ from the gear $e$. The hand-wheel $p$ may now be locked to the sleeve $b$ by dropping the pin $s$ into place after turning said hand-wheel until the holes $q$ and $r$ are in position to enable this to be done. Now by rotating the hand-wheel $p$ motion is imparted to the spindle through the medium of the sleeve $b$ without being obliged to actuate other parts of the motor-driven mechanism and the motor itself, as would be the case if no means were provided for disconnecting the latter. The members now stand as shown in Fig. 2. To restore the valve to the control of the motor, swing the bearing 14 into an upright position again, with the pinion $m$ and gear $e$ in mesh, and secure it in this position by tightening the screw 21. The mechanism is then in condition for operation by the motor, and the hand-wheel may be disconnected, if desired, by removing its locking-pin.

Instead of having a wide flange on the screw 21 to force the pin 20 into the recess 16 when said screw is tightened and to prevent said pin from dropping out of the hole 12 when the screw is loosened a smaller flange may be used, with a loose washer interposed between such smaller flange and the face of the bracket 10.

So far as has been described the movement of the bearing 14 is limited by the screw 21 and the ends of the slot; but with heavy valves it is desirable to provide an additional stop to limit such movement in one or both directions. I have shown for this purpose a projection 22 on one side of the bracket 10 and a lug 23 extending from one edge of the bearing 14. The projection 22 and the lug 23 are so arranged that when the bearing 14 is permitted to rock out of the perpendicular said lug engages said projection and limits the movement and when said bearing is restored to the perpendicular the edge thereof adjacent the projection 22 encounters the same, so as to limit this movement also.

Various stops or limiting devices for the movement of the bearing 14 other than those just described may be employed either at one or both limits of movement or none at all, as desired; but generally substantial abutments or stops should be used in order to prevent the pinion m from engaging the gear e with too much force or the gear k from encountering the spindle a or other adjacent parts. When such stops are used, the elongated opening 13 may be longer than would be necessary in their absence, but whether longer or not there is no liability of straining or breaking the screw 21.

It is obvious that the location of the pivot 19 may be changed so as to require pressure for rocking the bearing 14 in either direction or so that the preponderance of weight will tend to connect instead of disconnect the pinion m and gear e; but this last arrangement would always require locking means to retain the parts in their abnormal position, and in neither case would the desired degree of celerity in cutting out the motor be obtained as in the preferred form herein shown and described.

It will be apparent that the improved mechanism may be arranged to operate in a generally horizontal direction instead of the generally vertical direction shown without material change in structure and that various modifications, variations, and changes may be made without departing from my invention.

It is particularly to be noted that the parts are so constructed and arranged that while pinion m goes completely out of mesh with gear e pinion j and gear k remain always in mesh, though not to the full working depth. This is of importance, for the reason that it is always a difficult matter so to adjust two gears carried by one and the same shaft as to insure their meshing each with another and distinct gear. By retaining one of the gears of shaft l always in mesh with its coöperating gear the operator's work is reduced to bringing one pair of gears into meshing relation, which is easily and quickly effected. Obviously either the pinion m or the gear k (but one only) may be made thus to remain in mesh with its companion gear. It is preferred, however, that gear k should do so.

What I claim as my invention, and desire to secure by Letters Patent, is—

1. In combination with a stem or spindle, a toothed gear encircling and serving to actuate said stem; a motor; a toothed gear carried by said motor; an intermediate shaft; two toothed gears carried by said shaft, one arranged to mesh with the spindle-encircling gear and the other with the motor-gear; and a swinging or rocking support for said shaft pivoted at a point between the motor-gear and the spindle-encircling gear and adapted when rocked upon its pivot to carry one of its gears into or out of mesh with the coacting or companion gear, while leaving the other gears in mesh.

2. In combination with a stem or spindle to be actuated, a toothed gear, encircling and serving to actuate the stem; a motor; a toothed gear carried by said motor; an intermediate shaft; two toothed gears carried by said shaft, one arranged to mesh with the spindle-encircling gear and the other with the motor-gear; a swinging or rocking support for said shaft adapted to carry one of its gears into or out of mesh with the coacting or companion gear, while leaving the other gears in mesh; and a fixed stop located in the path of said support and serving to limit its movement.

3. In combination with a spindle or stem; a gear encircling and serving to actuate the same; a motor; a gear carried by said motor; an intermediate shaft provided with two gears, one arranged to mesh with the spindle-encircling gear and the other with the motor-gear; a swinging or rocking support for said shaft adapted to carry one of its gears into and out of mesh with the coacting or companion gear; a fixed stop to limit the movement of the support; and means for locking the support in adjusted position.

4. The combination, in disconnecting mechanism, with a shaft, gears thereon, and other gears adapted to be engaged by the first-mentioned gears, of a rocking bearing arranged to disconnect two of the engaging gears by gravity, and means to lock said bearing and retain the shaft-gears in mesh with the associated gears.

5. The combination, in disconnecting mechanism, of a suitable slotted support; a bearing for a shaft, pivotally connected with said support, and a flanged or shouldered screw passing through the slot in the support and into threaded engagement with said bearing, whereby the screw, when properly turned, is caused to draw the bearing and the support into holding frictional contact.

6. The combination, in disconnecting mechanism, with a suitable slotted support, of a bearing for a shaft pivotally connected with said support, a screw passing through the slot in the support into threaded engagement with said bearing, a retaining member on said screw, and a pin operating in the support within the circumference of said retaining member and arranged to engage the bearing when the screw is tightened.

In testimony whereof I have signed my name to this specification in the presence of two subscribing witnesses.

ERNEST G. HOWARD.

Witnesses:
 ALLEN WEBSTER,
 F. A. CUTTER.